US007076517B2

(12) United States Patent
Bartling

(10) Patent No.: US 7,076,517 B2
(45) Date of Patent: Jul. 11, 2006

(54) SERIAL COMMUNICATION DEVICE WITH DYNAMIC FILTER ALLOCATION

(75) Inventor: James Bartling, Chandler, AZ (US)

(73) Assignee: Microchip Technology Incorporated, Chandler, AZ (US)

( * ) Notice: Subject to any disclaimer, the term of this patent is extended or adjusted under 35 U.S.C. 154(b) by 761 days.

(21) Appl. No.: 09/957,061

(22) Filed: Sep. 20, 2001

(65) Prior Publication Data

US 2003/0056016 A1  Mar. 20, 2003

(51) Int. Cl.
*G06F 15/16* (2006.01)
(52) U.S. Cl. ...................................... 709/200
(58) Field of Classification Search ................ None
See application file for complete search history.

(56) References Cited

U.S. PATENT DOCUMENTS

| 3,623,011 | A | * | 11/1971 | Baynard et al. ............... 714/25 |
| 4,383,297 | A | * | 5/1983 | Wheatley et al. ............... 710/3 |
| 5,600,782 | A | | 2/1997 | Thomson ............... 395/182.02 |
| 5,901,070 | A | | 5/1999 | Trainor ................... 364/528.33 |
| 6,122,713 | A | | 9/2000 | Huang et al. ................ 711/147 |
| 6,587,968 | B1 | | 7/2003 | Leyva ........................... 714/43 |
| 6,631,431 | B1 | * | 10/2003 | Silvkoff et al. ............. 710/100 |
| 6,732,254 | B1 | * | 5/2004 | Slivkoff et al. ................ 712/37 |
| 6,912,594 | B1 | * | 6/2005 | Bartling ....................... 709/250 |
| 2001/0042137 | A1 | | 11/2001 | Otta et al. ................... 709/248 |
| 2002/0164242 | A1 | | 11/2002 | Wehrung et al. ............. 414/935 |
| 2003/0051061 | A1 | | 3/2003 | Hank et al. .................. 709/250 |

FOREIGN PATENT DOCUMENTS

| EP | 1 085 722 | 3/2001 |
| WO | 03/025740 | 3/2003 |

OTHER PUBLICATIONS

National Semiconductor Corp: "8-bit CMOS ROM based Microcontroller with 2k Memory, Comparators, and CAN Interface", URL:http://www.national.com/ds/CO/COP884B, 57 pages.
National Semiconductor Corp: "Replacing Dedicated Protocol Controllers with Code Efficient and Configurable Microcontrollers—Low Speed CAN Network Applications", URL:http://www.national.com/an/AN/AN-1048.pdf, 8 pages.
International Search Report PCT/US02/28661, 8 pages.

* cited by examiner

*Primary Examiner*—John B. Walsh
(74) *Attorney, Agent, or Firm*—Baker Botts L.L.P.

(57) ABSTRACT

A CAN module comprises a buffer memory comprising a data and address input and a plurality of addressable buffers, a data receive register being coupled with the buffer memory receiving data from a serial data stream, a filter register, a comparator comparing the filter register value with an identifier transmitted in the serial data stream generating an acceptance signal, a buffer pointer coupled with the comparator to receive the acceptance signal, and an address register receiving an address from the buffer pointer for addressing the buffer memory. The arrangement can dynamically assign any filter register to any buffer within the buffer memory.

25 Claims, 5 Drawing Sheets

SERIAL COMMUNICATION DEVICE WITH DYNAMIC FILTER ALLOCATION

FIELD OF THE INVENTION

The present invention relates to a serial communication device, in particular a Controller Area Network (CAN) device. Furthermore, the present invention relates to a microcontroller with a serial communication device and a method of operating a serial communication device.

BACKGROUND OF THE RELATED TECHNOLOGY

Controller Area Network (CAN) is a serial communications protocol which efficiently supports distributed real-time control with a high level of security. Applications of CAN range from high speed digital communications networks to low cost multiplex wiring. CAN is a high-integrity serial data communications bus for real-time applications. CAN operates at data rates of up to 1 Megabits per second, has excellent error detection and confinement capabilities, and was originally developed for use in automobiles. The interface between the CAN bus and the CPU is usually called the CAN controller. The motivation behind CAN was to make automobiles more reliable, safe and fuel-efficient by improving the interoperability of automotive electronics, engine control units, sensors, anti-skid brake systems, etc., while decreasing wiring harness weight and complexity. Since CAN's inception, the CAN protocol has gained widespread popularity in industrial automation and automotive/truck applications. The robustness of the CAN bus in noisy environments and the ability to detect and recover from fault conditions makes CAN suitable for use with, industrial control equipment, medical equipment, test equipment, mobile and portable machines, appliances, etc.

CAN is an asynchronous serial bus system with one logical bus line. It has an open, linear bus structure with equal bus nodes. A CAN bus consists of two or more nodes. The number of nodes on the bus may be changed dynamically without disturbing the communication of the other nodes.

The CAN logic bus corresponds to a "wired-AND" mechanism, "recessive" bits (mostly, but not necessarily equivalent to the logic level "1") are overwritten by "dominant" bits (mostly logic level "0"). As long as no bus node is sending a dominant bit, the bus line is in the recessive state, but a dominant bit from any bus node generates the dominant bus state. Therefore, for the CAN bus line, a medium is chosen that is able to transmit the two possible bit states (dominant and recessive). A common physical medium used is a twisted wire pair. The bus lines are then called "CANH" and "CANL," and may be connected directly to the CAN controller nodes or via a connector thereto.

In the CAN bus protocol it is not bus nodes that are addressed, but rather the address information is contained in the messages that are transmitted. This is done via an identifier (part of each message) which identifies the message content, e.g., engine speed, oil temperature, etc. The identifier additionally indicates the priority of the message. The lower the binary value of the identifier, the higher the priority of the message (more dominant bits).

The original CAN specifications (Versions 1.0, 1.2 and 2.0A) defined the message identifier as having a length of 11 bits, giving a possible 2048 message identifiers. An "extended CAN" specification Version 2.0B allows message identifier lengths of 11 and/or 29 bits to be used (an identifier length of 29 bits allows over 536 Million message identifiers). The CAN specifications (all versions) are incorporated by reference herein for all purposes.

Generally, two approaches may be used for CAN since an architecture for the CAN controller is not covered by the CAN standard, these two approaches are: "BasicCAN" and "FullCAN" (not to be confused with CAN 1 and CAN 2, or standard identifiers and extended identifiers); they differ in the buffering of messages.

The BasicCAN controller architecture is similar to simple UART, except that complete frames are sent instead of characters. Typically, there is a single transmit buffer and a double-buffered receive buffer. For example, a microcontroller puts a frame in the transmit buffer, and receives an interrupt when the frame is sent. When a frame is received in the receive buffer, the microcontroller receives an interrupt to empty the receive buffer and empties the frame from the receive buffer before a subsequent frame is received. In the BasicCAN controller architecture the microcontroller must manage the transmission and reception, and handle the storage of the frames.

The FullCAN controller architecture stores frames in the controller itself. A limited number of frames may be dealt with. Each frame buffer is tagged with the identifier of the frame mapped to the buffer. The microcontroller can update a frame in the buffer and mark it for transmission. Receive buffers can be examined to see if a frame with a matching identifier has been received. In addition, filters may be used to pre-screen a received frame so that only those frames intended for use by the particular CAN controller is stored in a receive buffer.

Standard CAN vs. Extended CAN

The CAN protocol usually comes in two versions: CAN 1.0 and CAN 2.0. CAN 2.0 is backwardly compatible with CAN 1.0, and most new controllers are built according to CAN 2.0. There are two parts to the CAN 2.0 standard: part A and part B. With CAN 1.0 and CAN 2.0A, identifiers must be 11-bits long. With CAN 2.0B identifiers can be 11-bits (a "standard" identifier) or 29-bits (an "extended" identifier). To comply with CAN 2.0 a controller must be either 2.0 part B passive, or 2.0 part B active. If it is passive, then it must ignore extended frames (CAN 1.0 controllers will generate error frames when they see frames with 29-bit identifiers). If it is active then it must allow extended frames to be received and transmitted. There are some compatibility rules for sending and receiving the two types of frames:

CAN 2.0B active controllers will send and accept both standard and extended frames.

CAN 2.0B passive controllers will send and receive standard frames, and will discard extended frames without error.

CAN 1.0 controllers will generate errors when they see extended frames.

So a network where there is a single CAN 1.0 controller on the network cannot live with extended frames on the network; all the controllers must send using standard frames."

Controller Architectures

The architecture of controllers isn't covered by the CAN standard, so there is a variation in how they are used. There are, though, two general approaches: BasicCAN and FullCAN (not to be confused with CAN 1.0 and 2.0, or standard identifiers and extended identifiers); they differ in the buffering of messages."

In a BasicCAN controller the architecture is similar to a simple UART, except that complete frames are sent instead of characters: there is (typically) a single transmit buffer, and a double-buffered receive buffer. The CPU puts a frame in the transmit buffer, and takes an interrupt when the frame is sent; the CPU receives a frame in the receive buffer, takes an interrupt and empties the buffer (before a subsequent frame is received). The CPU must manage the transmission and reception, and handle the storage of the frames."

In a FullCAN controller the frames are stored in the controller. A limited number of frames can be dealt with (typically 16); because there can be many more frames on the network, each buffer is tagged with the identifier of the frame mapped to the buffer. The CPU can update a frame in the buffer and mark it for transmission; buffers can be examined to see if a frame with a matching identifier has been received."

The intention with the FullCAN design is to provide a set of "shared variables" in the network; the CPU periodically updates the variables (i.e. the contents of frames in the buffer); the CPU also can examine the variables. In practice, things are not so simple (of course) because of concurrency difficulties: while reading a set of bytes from a frame, the controller could overwrite the data with the contents of a new frame, and in many controllers this is signaled only by a status flag."

In "Basic CAN" implementations, there is generally one double buffered receive channel with one or more associated message acceptance filters. Having but one double buffered message channel means that the processor must be capable of handling the previous message within this time. In "Full CAN" implementations, there are generally up to 15 message buffers or channels, each with one associated message acceptance filter. Having a large number of receive-buffers can be helpful in dealing with bursts of message traffic if the processor is very slow, however, if the total message traffic is such that it overwhelms the processor capability, no amount of buffering can prevent the eventual loss of a message. If a processor's CPU is very slow, to receive many different addressed messages requires separate receive buffers and acceptance filters. With a faster processor, it is possible to use a more limited number of receive buffers with flexibility in the programming of the acceptance filters. In short, the processor must have the bandwidth to service the total traffic on the bus. A plurality of buffers is usually implemented as a compromise. However, each receive buffer has associated a plurality of mask registers and filter registers. This requires a large amount of silicon real estate. Furthermore, each mask and filter can only be used with the respective buffer. If one or more buffers are not in use the respective mask and filter cannot be assigned to a different buffer.

There is, therefore, a need in the art for a CAN implementation that does not require a large number of masks and filter registers and is more flexible than the prior art implementation.

SUMMARY OF THE INVENTION

The invention overcomes the above-identified problems as well as other shortcomings and deficiencies of existing technologies by a CAN module comprising a buffer memory comprising a data and address input and a plurality of addressable buffers, a data receive register being coupled with the buffer memory receiving data from a serial data stream, a filter register, a comparator comparing the filter register value with an identifier transmitted in the serial data stream generating an acceptance signal, a buffer pointer coupled with the comparator to receive the acceptance signal, and an address register receiving an address from the buffer pointer for addressing the buffer memory.

Another exemplary embodiment is a microcontroller comprising a central processing unit, a random access memory connected to the central processing unit, and a CAN module coupled with the central processing unit, whereby the CAN module comprises a buffer memory comprising a data and address input and a plurality of addressable buffers, a data receive register being coupled with the buffer memory receiving data from a serial data stream, a filter register, a comparator comparing the filter register value with an identifier transmitted in the serial data stream generating an acceptance signal, a buffer pointer coupled with the comparator to receive the acceptance signal, and an address register receiving an address from the buffer pointer for addressing the buffer memory.

A plurality of filter registers and associated buffer pointer can be provided, wherein a address bus couples the plurality of buffer pointers with the address register. The data receive register can further be provided within a message assembly buffer shift register. The buffer memory can comprises n buffers and the address pointer then comprises m bits, whereby $2^m = n$. Furthermore at least one mask register being coupled with at least one filter register can be provided. The buffer memory is preferably a dual port memory. One port is coupled with the CPU and the other port is coupled with the data receive register. Thus, CAN module and a CPU of a microcontroller can access the buffer memory independently. The comparison can be performed bit-wise in a serial manner for each frame containing an identifier or parallel. To this end, each mask and filter register is bit addressable and a bit select unit is provided to select the respective bits from said registers for comparison with a bit within an identifier bit stream for each frame.

A method of operating a CAN module comprises the steps of:

receiving a data stream;

generating an identifier and data out of the data stream;

comparing the identifier with a filter;

generating an acceptance signal if the comparison is positive;

supplying an address upon generation of the acceptance signal to a buffer memory address input; and storing associated data in the addressed buffer.

The method can further comprise the steps of comparing the identifier with a plurality of filter values and generating a programmable buffer address for each match. Furthermore, the step of supplying an address can comprise the steps of:

outputting an address upon generating the acceptance signal;

latching the address within an address register; and addressing the buffer memory.

Moreover, the method can comprise the step of masking the identifier. The comparison and masking can be performed in a serial or parallel manner.

The arrangement can dynamically assign any filter register to any buffer within the buffer memory. Thus, the necessary hardware to provide a flexible environment within a CAN controller can be minimized without sacrificing performance. The assignment of any filter can be dynamically changed within an application and therefore provides more flexibility than prior art systems. The implementation of a serial comparison avoids the need for large parallel comparators which otherwise are necessary for each filter register.

The foregoing and other objects, features, and advantages of the invention will be apparent from the following, more particular, description of the preferred embodiments of the invention, as illustrated in the accompanying drawings.

DETAILED DESCRIPTION OF THE PREFERRED EMBODIMENT

Figure 1:
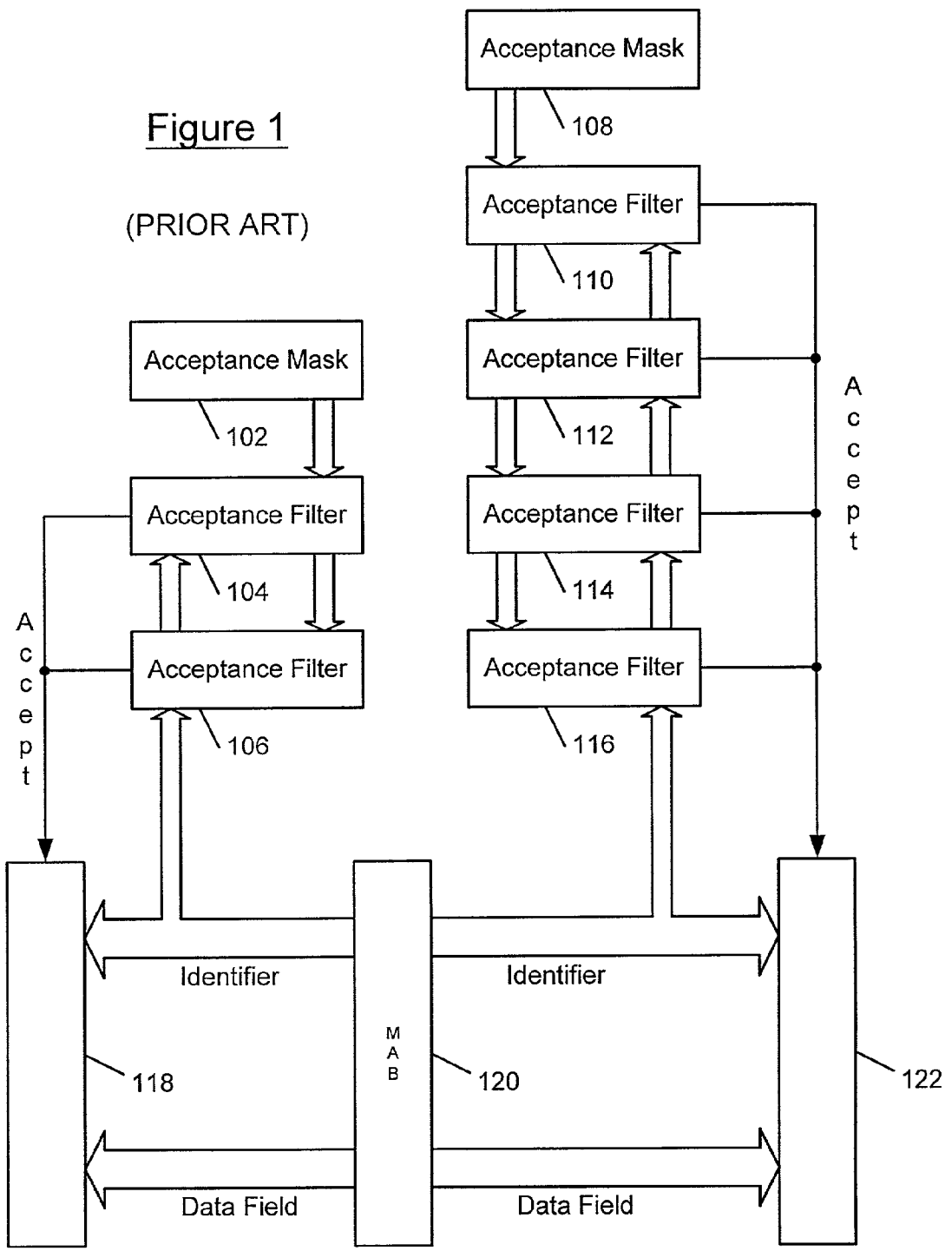
FIG. 1 is a schematic diagram of the receive buffers and their associated filters according to the prior art.

Referring to FIG. 1, receive buffers 118, 120, and 122 and associated mask 102, 108 and filter registers 104, 106, 110, 112, 114, 116 according to the prior art are illustrated. Buffer 120, designated as a message assembly buffer (MAB), functions only to monitor the CAN logic bus (not shown) for incoming messages. The MAB 120 holds a de-stuffed bit stream from the bus line. The bit stream consists of a message, i.e. a data frame, remote frame, or other frame, comprising an identifier and data field (not shown). The MAB 120 allows receive buffers 118 and 122 parallel access to the message. MAB 120 also allows acceptance filters 106 and 116 access to the identifier portion of the message. Parallel transfer of the bit stream message to receive buffers 118 or 122 is not allowed until acceptance masks 102 and 108 and acceptance filters 104, 106, 110, 112, 114, and 116 apply an acceptance match test to the message.

Programmable acceptance filter masks 102 and 108, respectively, are used to select which bits of the unstuffed bit-stream message should be compared with the contents of acceptance filters 104 and 106, and 110, 112, 114, and 116.

The acceptance match test proceeds as follows: Filters 104, 106, 110, 112, 114, and 116 receive the identifier field of the message and compare that field to filter values. If there is a match between the identifier field and a filter value, then the message is loaded into the matching filter's corresponding receive buffer 118 or 122. Filters 104 and 106 are connected to buffer 118, filters 110, 112, 114, and 116 to buffer 122.

There is an implied priority to the receive buffers. Buffer 118 is the higher priority buffer and has message acceptance filters 104 and 106 associated with it. Buffer 122 is the lower priority buffer and has acceptance filters 110, 112, 114, and 116 associated with it. That fewer filters are associated with buffer 118 than with buffer 122 means that buffer 118 is more restrictive than buffer 122. The more restrictive buffer 118 has, by implication, the higher criticality associated with it.

On the occasion when two "high-priority" messages are received by MAB 120 in quick succession, receive buffer 118, designated as the first high-priority buffer, will receive the first high-priority message. Upon receipt of the second high-priority message, MAB 120 finds that buffer 118 is currently occupied by a high-priority message. MAB 120 then directs buffer 122, designated as the second high-priority buffer, to receive the second high-priority message. Buffers 118 and 122 are ranked, respectively, as the first high-priority buffer and the second high-priority buffer in this scenario.

The central processing unit (CPU) (not shown) may operate on one of the receive buffers 118 and 122, while the other is available for reception or holding a previously received message.

The protocol in the case of the arrival of two high-priority messages is effected by the BUKT bit in the control registers (not shown) of receive buffers 118 and 122. Table I depicts and explains the control register of receive buffer 118, wherein R/W means Readable/Writable bit, and wherein R means Read-only bit.

TABLE I

| bit7 | bit6 | bit5 | bit4 | bit3 | bit2 | bit1 | bit0 |
|------|------|------|------|------|------|------|------|
| R/W  | R/W  | R/W  | R/W  | R/W  | R/W  | R    | R/W  | bit7: Message Ready Status
   1=Receive Buffer contains a valid received message
   0=Receive Buffer open to receive new message
   Bit is only set by CAN module, bit is only cleared by CPU.
bit6-5: Receive Buffer Operating Mode
   11=receive all messages including those with errors
   10=receive only valid messages with extended identifiers
   01=receive only valid messages with standard identifiers
   00=receive all valid messages
bit4: Message Reception Interrupt Enable
   1=Interrupt Enabled
   0=Interrupt Disabled
bit3: Received Remote Transfer Request
   1=Remote Transfer Request Received
   0=No Remote Transfer Request Received
bit2: (BUKT) Enable Overflow to Receive Buffer 122
   1=Receive Buffer 118 Overflow Will Write to Buffer 122
   0=No Overflow to Buffer 122 Allowed
bit1: Read Only Copy of bit2 (BUKT)
bit0: Indicates which acceptance filter enabled the message reception
   1=acceptance filter associated with Buffer 122
   0=acceptance filter associated with Buffer 118
If set to "1," the BUKT bit implements the priority-based protocol of the present invention.

Table II depicts and explains the control register of receive buffer 122.

TABLE II

| bit7 | bit6 | bit5 | bit4 | bit3 | bit2 | bit1 | bit0 |
|------|------|------|------|------|------|------|------|
| R/W  | R/W  | R/W  | R/W  | R/W  | R/W  | R/W  | R/W  | bit7: Message Ready Status
   1=Receive Buffer contains a valid received message
   0=Receive Buffer open to receive new message
   Bit is only set by CAN module, bit is only cleared by CPU.
bit6-5: Receive Buffer Operating Mode [these bits are optional]
   11=receive all messages including those with errors
   10=receive only valid messages with extended identifiers
   01=receive only valid messages with standard identifiers
   00=receive all valid messages
bit4: Message Reception Interrupt Enable 1=Interrupt Enabled
0=Interrupt Disabled
bit3: Received Remote Transfer Request
   1=Remote Transfer Request Received
   0=No Remote Transfer Request Received
bit2-0: Indicates which acceptance filter enabled the message reception
   101=acceptance filter 116
   100=acceptance filter 114
   011=acceptance filter 112
   010=acceptance filter 110
   001=acceptance filter 106 [only if BUKT bit set to "1" in control register for buffer 118]
   000=acceptance filter 104 [only if BUKT bit set to "1" in control register for buffer 118]

Figure 2:
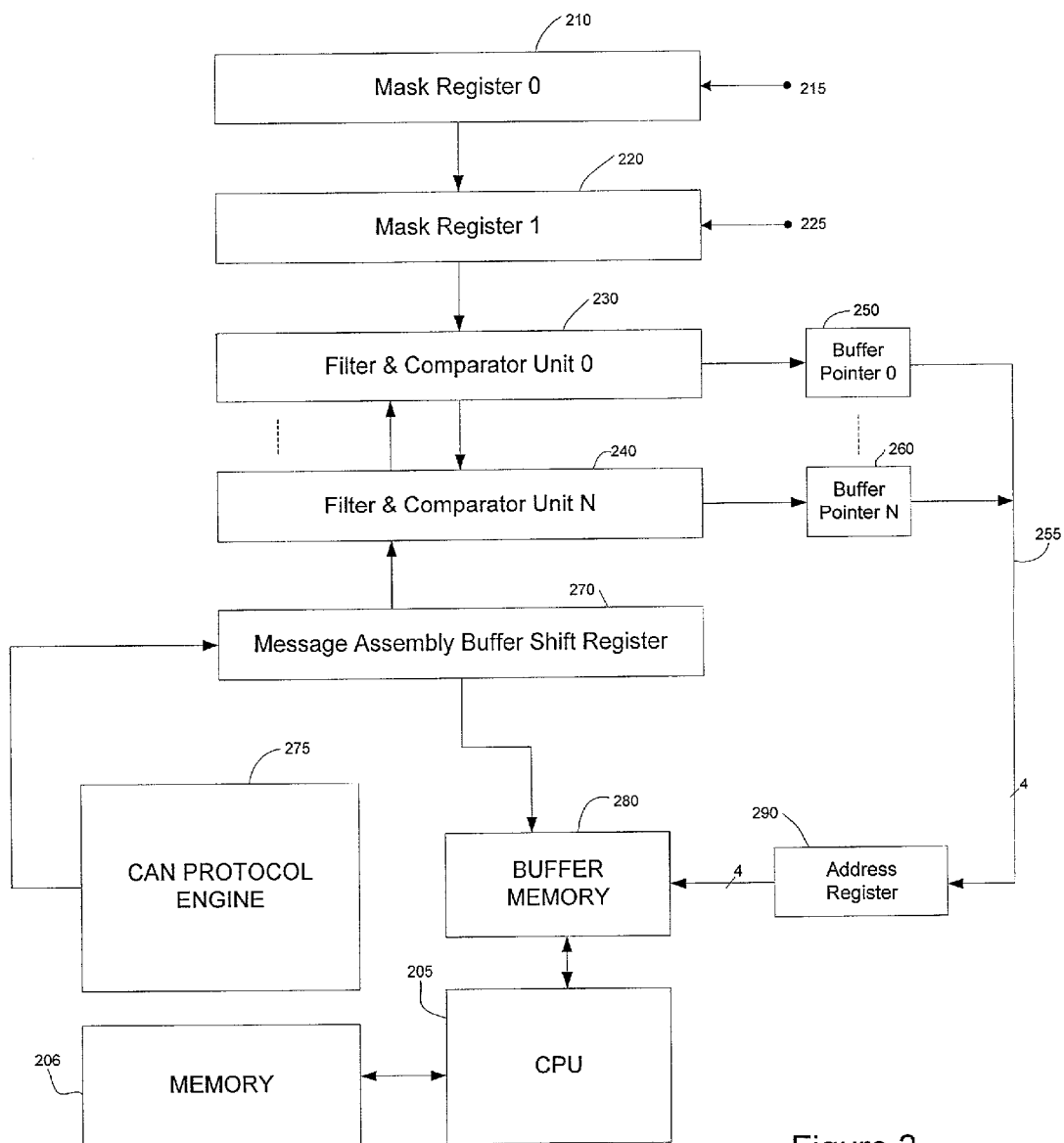
FIG. 2 is a schematic diagram of the receive buffers and their associated filters according to a first exemplary embodiment of the present invention.

FIG. 2 shows an arrangement of buffers and associated mask and filter/comparator registers according to an exemplary embodiment of the present invention. FIG. 2 shows only relevant elements of the arrangements. This embodiment comprises storing and comparing in a parallel way. Two mask registers 210 and 220 are coupled with a plurality of filter registers & comparator units 230, 240 (only two are shown in FIG. 2). Each mask register can be selected through respective select lines 215 and 225. The units 230, 240 receive the identifier field from a message assembly register 270. Each unit 230, 240 has an associated 4 bit buffer pointer 250, 260. The output of these buffer pointers 250, 260 are coupled through buffer pointer bus 255 with the input of address register 290. The output of address register 290 is coupled with the address input of a buffer memory 280. A message assembly register 270 receives a serial data stream from a CAN protocol engine 275 and assembles the identifier and additional transmitted data. Message assembly register 270 outputs the identifier in parallel to the filter register & comparator units 230, 240 and the data in parallel to the data input of buffer memory 280. The buffer memory 280 can be designed as a dual port memory. One port is coupled with the message assembly register and the other port is coupled with a central processing unit (CPU) 205 of a microcontroller which includes the CAN module. The CPU 205 is coupled with a memory 206, for example a random access memory for storing program and data information.

The functionality of the filters/comparators and the masks is identical to the functionality as described above. However, the plurality of filter registers & comparator units 230 . . . 240 do not have a static assignment to specific buffers. Each filter & comparator units 230 . . . 240 can be dynamically assigned to any buffer within the buffer memory 280. The buffer memory 280 can consist, for example, of 16 buffers. Therefore, in this exemplary embodiment, 4 bits are necessary to address each single buffer within the buffer memory 280. Any number n of buffers within buffer memory 280 is possible. To be able to address all n buffers within buffer memory 280 buffer pointers must provide a bit length of m, whereby $2^m$=n. Each filter & comparator unit 230, 240 therefore has an associated buffer pointer 250, 260. Each buffer pointer 250, 260 is programmable (connection with CPU not shown) and comprises in the shown exemplary embodiment 4 bits to address the 16 buffers within buffer memory 280. Filter & comparator unit 230, 240 compare the identifier in a parallel way. Each time a filter & comparator unit, for example, filter & comparator units 230, matches an identifier supplied from message assembly register 270, the filter generates an acceptance signal. In addition, one of two mask registers can be selected. The mask registers 210, 220 define which bits of the filter register will be compared. If acceptance signal of a filter & comparator unit 230 is generated, then this signal forces the content of buffer pointer 250 onto the buffer pointer bus 255 where the address register 290 subsequently latches it. The respective data from message assembly register 270 is then stored at the respective addressed location within buffer memory 280. Since the buffer pointer can be loaded with any value, a filter & comparator unit 230, 240 can be programmed to point to any of up to 16 message buffers. Thus, filters can be easily switched between receive buffers. This provides a flexible use of resources. The same tasks as in the prior art can therefore be accomplished with less elements and thus less silicon real estate.

The CPU 205 is, as described above, preferably coupled with the buffer memory 280 through a second port of the buffer memory 280. Thus, CAN protocol engine 275 and CPU 205 can access buffers within the buffer memory 280 independently.

Figure 3:
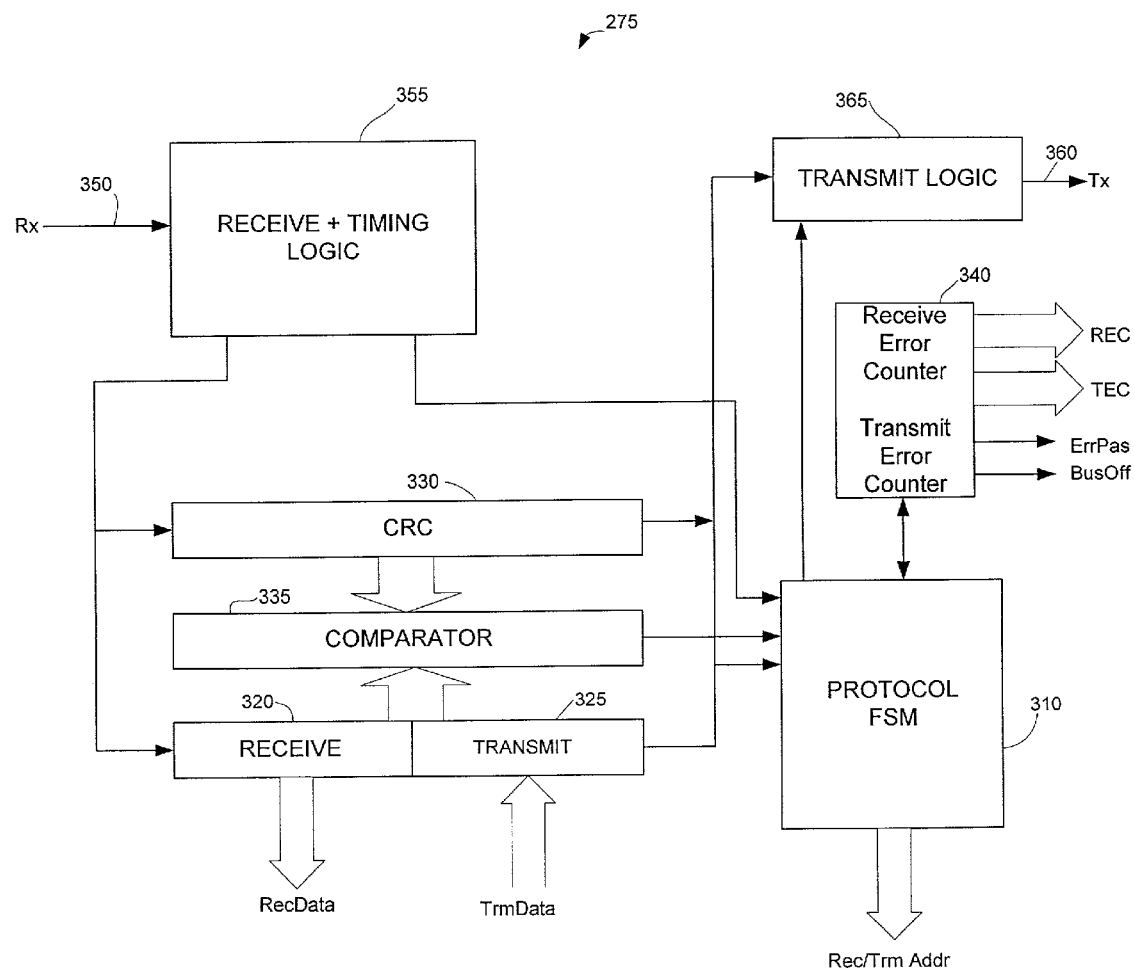
FIG. 3 shows details of the CAN protocol engine according to the exemplary embodiment shown in FIG. 2.

FIG. 3 shows the CAN protocol engine 275 in more detail. The protocol engine 275 combines several functional blocks. The heart of the engine 275 is the protocol finite state machine 310 (FSM). This state machine sequences through the messages on a bit by bit basis, changing states of the machine as various fields of various frame types are transmitted or received. The FSM 310 is a sequencer controlling the sequential data stream between the RX/TX shift register 320, 325, the CRC Register 330, and the receive bus line 350 and transmit bus line 360, respectively. The shift registers 320, 325 can be part of the message assembly register 270. Additional components 355 and 365 are provided to convert the data streams and adapt to the respective timing on the bus lines 350 and 360. The FSM also controls the Error Management Logic 340 (EML) and the parallel data stream RecData between the TX/RX shift register 320, 325 and other components of the CAN module. The processes of reception arbitration, transmission, and error signaling are performed according to the CAN protocol. The FSM 310 also handles any automatic transmission of messages on the bus line.

The data interface to the protocol engine 275 consists of byte wide transmit and receive data. Rather than assembling and shifting an entire frame, the frames are broken into bytes. A receive or transmit address from the protocol FSM 310 signifies which byte of the frame is current. For transmission, the appropriate byte from the transmit buffer is selected and presented to the engine, which then uses an 8-bit shift register to serialize the data. For reception, an 8-bit shift register assembles a byte which is then loaded within the appropriate byte in the message assembly buffer 270.

The cyclic redundancy check register 330 generates the Cyclic Redundancy Check (CRC) code to be transmitted over the data bytes and checks the CRC code of incoming messages. The Error Management Logic (EML) 340 is responsible for the fault confinement of the CAN device. Its counters, the Receive Error Counter and the Transmit Error Counter, are incremented and decremented by commands from the Bit stream processor. According to the values of the error counters, the CAN controller is set into states error active, error passive or bus off.

The Bit Timing Logic (BTL) within unit 355 monitors the bus line input and handles the bus line related bit timing according to the CAN protocol. The BTL synchronizes on a recessive to dominant bus line transition at Start of Frame and on any further recessive to dominant bus line transition, if the CAN controller itself does not transmit a dominant bit. The BTL also provides programmable time segments to compensate for the propagation delay time and for phase shifts and in defining the position of the Sample Point in the bit time. The programming of the BTL depends on the baud rate and on external physical delay times.

Figure 4:
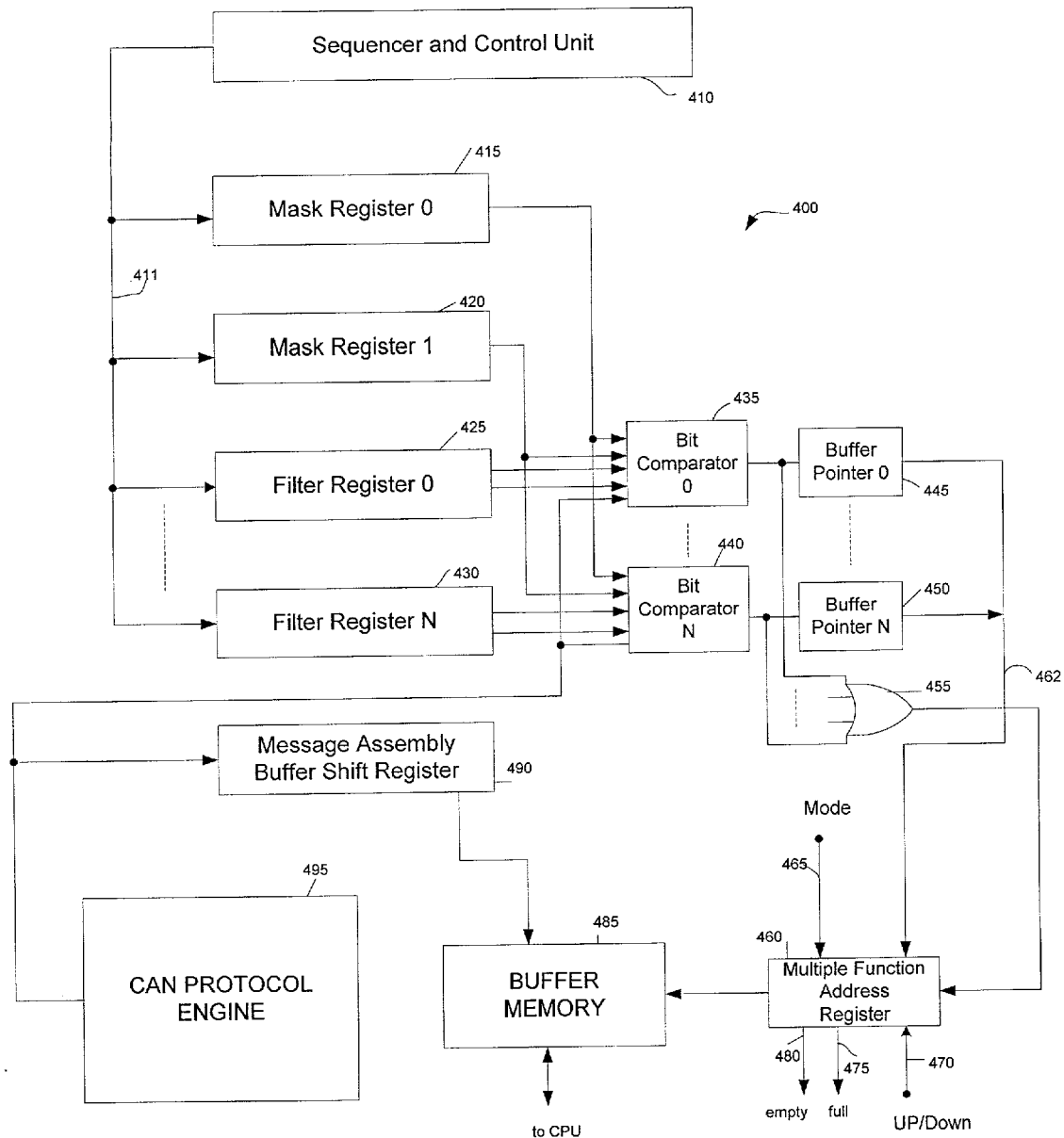
FIG. 4 shows a schematic diagram of the receive buffers and their associated filters according to a second exemplary embodiment of the present invention.

FIG. 4 shows another exemplary embodiment of the present invention comprising a serial comparison. FIG. 4 shows only the CAN module 400. A first and second mask register 415 and 420 are bit-wise addressable and comprise a single output bit. Furthermore, a plurality of filter registers 0 . . . N (only two are shown) are designated by numerals 425 and 430. The filter registers 425, 430 also comprise a single output bit and are bit-wise addressable. In addition mask registers 415 and 420 as well as all filter registers 425, 430 are read and write-able in a parallel mode by a central processing unit (not shown in FIG. 4). A sequencer and control unit 410 operates as a bit select unit and generates address signals which are fed to mask register 415 and 420 and all filter registers 425, 430. Each filter register 425, 430 comprises an associated bit comparator unit 435, 440. The bit output signal of mask register 415 and 420 are fed to first and second inputs of bit comparator units 435, 440. Furthermore, each bit output of the filter registers 425, 430 is fed to a third input of their associated bit comparator unit 435, 440. A bit stream signal from a CAN bus is provided by a CAN protocol engine 495 and fed to a fourth input of each bit comparator unit 435, 440. Filter registers 425, 430 can provided additional storage bits which are coupled with a fifth input of each associated bit comparator unit. The output of each bit comparator unit 435, 440 carries the acceptance signal and is coupled with a control input of an associated buffer pointer 445, 450. An OR gate 455 is provided having as many inputs as the number of filter registers. Each input receives an acceptance signal from a respective bit comparator unit 435, 440. The output of each buffer pointer 445 and 450 are coupled with a buffer pointer bus 462 which is connected to an address input of a multiple function address register 460. The outputs of OR gate 455 is coupled with a control input of multiple function register 460. Multiple function register 460 further comprises a mode control input 465, a first status output 475 indicating whether a buffer memory 485 is full, a second status output 480 indicating whether a buffer memory 485 is empty, and an up/down control input for a counter function of the multiple function address register 460. An address output 464 of multiple function address register 460 is coupled with the address input of buffer memory 485. Buffer memory 485 is preferably a dual port memory whose first port is coupled with a message assembly buffer shift register 490 receiving the serial data stream from the CAN protocol engine 495. The second port of is coupled with a central processing unit (not shown).

This embodiment provides additional options to write data from a serial data stream into the buffer memory 485. Furthermore, the comparison of filter values stored in filter registers 425, 430 and transmitted identifiers is done in a bit-wise fashion rather than in parallel. Thus, parallel comparators, which need a relatively big amount of silicon real estate, are avoided. A serial data stream provided by CAN protocol engine 495 comprises an identifier which is fed directly to all bit comparator units 435, 440. Sequencer and control unit 410 address the mask registers 415, 420 and all filter registers 425, 430 to output a corresponding bit to the bit comparator units 435, 440. The bit comparator units 435, 440 compare all filter register bits with the respective identifier bit within a frame. The result is further processed by comparing it to the respective mask register bit. To this end, the additional storage bits of each filter register 425, 430 can indicated which mask register should be used for this comparison. This function will be explained in more detail below. The final comparison result will be accumulated for all bits of each identifier within a frame. If a single comparison fails the acceptance signal will not be generated. If every bit comparison is positive the acceptance signal will be fed to the respective buffer pointer 445, 450 and to a respective input of OR gate 455.

A central processing unit can control the multiple function address register 460 in the following manner. Two modes can be selected through mode signal 465. In the first mode the buffer pointer 445, 450 work in the same way as described above in conjunction with FIG. 2. Multiple function address register 460 latches an address which has been put on address bus 462 and addresses buffer memory 485 stores data in parallel that has been assembled by message assembly buffer shift register 490.

A second mode can be selected by means of control signal 465. In this mode the buffer pointers 445, 450 are not needed and therefore their output signals will be neglected. When this mode is activated the actual address register within multiple function address register is set, for example, to "Fh" and the status signal 480 will signal an empty buffer. Every time a bit comparator unit 435, 440 generates an acceptance signal this triggers an increment function of the multiple function address register 460 and its content will therefore be incremented by 1. Thus, the first data assembled by message assembly buffer shift register 490 will be stored at memory location 0. This function provides a so called FIFO functionality of the CAN module in which no buffer is associated with any bit comparator. The buffer memory 485 will be sequentially written until the address reaches Fh again which indicates that the buffer is full unless the CPU has read previous entries. A full buffer memory 485 will be indicated by control signal 475. In an additional mode control signal 470 can select between a incrementing and decrementing function of the address register. Additional signals can be provided by the CPU to indicate whether a buffer value has been read for generating the proper status signals 475, and 480 and to ensure that no value will be overwritten before it has been fetched by the CPU. Furthermore, the increment/decrement function of the address register can of course be performed before storing of the data or after storing of the data.

Figure 5:
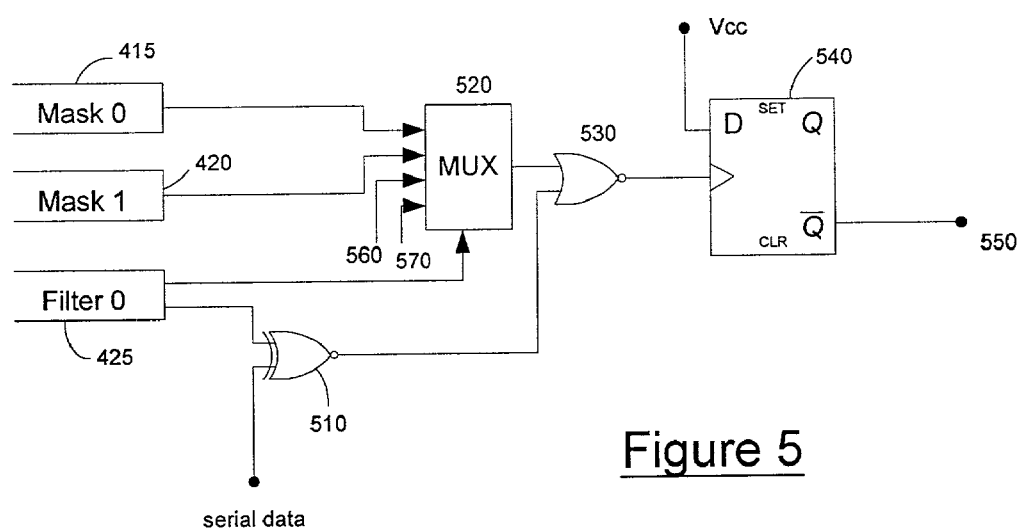
FIG. 5 shows details of a bit comparator unit according to FIG. 4.

FIG. 5 shows a bit comparator unit 435, 440 in more detail. The details are shown for Bit comparator unit 0 but apply for all other bit comparator units accordingly. The outputs of mask register 415 and 420 are coupled with first and second inputs of a 4:1 multiplexer 520. Additional input 560 and 570 can be provided at the third and fourth input of multiplexer 520. Filter register 425 comprises, for example, two additional outputs which are coupled with the select input of multiplexer 520. The output of multiplexer 520 is connected to the first input of a NOR gate 530. NOR gate 530 operates as a validation unit indicating whether a comparison result will be used or ignored. The second input of NOR gate 530 is coupled with the output of an Exclusive NOR gate 510 whose first input receives the bit output signal from filter register 425 and whose second input receives the serial data stream from CAN protocol engine 495. The output of NOR gate 530 is coupled with the control input of a D-Flip-Flop 540. The D-input of D-Flip-Flop 540 receives a logical low signal. The acceptance signal is carried at the negating output 550 of D-Flip-Flop 540.

The first comparison stage is formed by Exclusive NOR gate 510. In this stage the identifier bits of the serial bit stream are compared with the respective bits of filter register 425. Sequencer unit 410 selects the respective bits within filter register 425. Filter register 425 comprises additional data bits which indicate which mask register should be used. In this exemplary embodiment four different values can be selected. Either one of the mask registers 415 or 420 can be selected or a third value can be provided by another filter register, for example a filter register 15 (not shown). The fourth possible selection 570 can be used to indicate that no mask will be used by providing a respective level, for example, a logical "1". Thus, each filter register 425, 430 can be assigned an individual mask function. The selected mask value will be put at the first input of NOR gate 530. If the mask value indicates that the respective bit in filter register 425 should be used NOR gate 530 will operate as a controllable switch and feed the comparison result of Exclusive NOR gate 510 to the control input D-Flip-Flop 540. If the result of one comparison is negative indicating no match and the respective mask bit is valid, D-Flip-Flop 540 will be cleared and no acceptance signal 550 will be generated after the last identifier bit has been compared.

Any other type of appropriate logic can be used to implement the comparator. For example, controllable switches, equivalent Boolean operators, etc. can be used. Furthermore, the validation unit can be either put in front of the comparator or after the comparator. The essential function of a validation unit is to either incorporate selected bits or exclude them from comparison.

The invention, therefore, is well adapted to carry out the objects and attain the ends and advantages mentioned, as well as others inherent therein. While the invention has been depicted, described, and is defined by reference to particular preferred embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described preferred embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. A CAN module comprising:
a buffer memory comprising a data and address input and a plurality of addressable buffers;
a data receive register being coupled with said buffer memory receiving data from a serial data stream;
a filter register;
a comparator comparing said filter register value with an identifier transmitted in said serial data stream generating an acceptance signal that dynamically assigns the filter register to any one of said addressable buffers;
a buffer pointer coupled with said comparator to receive said acceptance signal; and
an address register receiving an address from said buffer pointer for addressing said buffer memory.

2. A CAN module according to claim 1 further comprising a plurality of filter registers and associated buffer pointer, wherein a address bus couples said buffer pointers with said address register.

3. A CAN module according to claim 1 wherein said data receive register is provided within a message assembly register.

4. A CAN module according to claim 1 wherein said buffer memory comprises n buffers and said address pointer comprises m bits, whereby $2^m = n$.

5. A CAN module according to claim 1, further comprising at least one mask register being coupled with at least one filter register for masking selected bits from said filter register.

6. A CAN module according to claim 1, further comprising a bit select unit selecting a single bit of said filter register and wherein said filter register is bit addressable and said comparator is a single bit comparator for comparing each identifier bit of an identifier transmitted in a frame from said serial bit stream with said single bit of said filter register.

7. A CAN module according to claim 6, further comprising a flip-flop coupled with said comparator whose output signal is deactivated during a frame if at least one comparison fails.

8. A CAN module according to claim 7, further comprising at least one mask register being bit addressable, wherein said bit select unit addresses said mask register and said selected bit controlling a validation unit validating said bit comparison.

9. A CAN module according to claim 8, wherein said filter register comprises data bits indicating a mask register from a plurality of mask registers and a select unit coupled with said data bits for selecting one of said mask registers.

10. A microcontroller comprising:
a central processing unit;
a random access memory connected to said central processing unit; and
a CAN module coupled with said central processing unit, wherein said CAN module comprises:
a buffer memory comprising a data and address input and a plurality of addressable buffers;
a data receive register being coupled with said buffer memory receiving data from a serial data stream;
a filter register;
a comparator comparing said filter register value with an identifier transmitted in said serial data stream generating an acceptance signal that dynamically assigns the filter register to any one of said addressable buffers;
a buffer pointer coupled with said comparator to receive said acceptance signal; and
an address register receiving an address from said buffer pointer for addressing said buffer memory.

11. A microcontroller according to claim 10, further comprising a plurality of filter registers and associated buffer pointer, wherein a address bus couples said buffer pointers with said address register.

12. A microcontroller according to claim 10, wherein said data receive register is provided within a message assembly register.

13. A microcontroller according to claim 10, wherein said buffer memory comprises n buffers and said address pointer comprises m bits, whereby $2^m = n$.

14. A microcontroller according to claim 10, further comprising at least one mask register being coupled with at least one filter register for masking selected bits from said filter register.

15. A microcontroller according to claim 10, further comprising a bit select unit selecting a single bit of said filter register and wherein said filter register is bit addressable and said comparator is a single bit comparator for comparing each identifier bit of an identifier transmitted in a frame from said serial bit stream with said single bit of said filter register.

16. A microcontroller according to claim 15, further comprising a flip-flop coupled with said comparator whose output signal is deactivated during a frame if at least one comparison fails.

17. A microcontroller according to claim 16, further comprising at least one mask register being bit addressable, wherein said bit select unit addresses said mask register and said selected bit controlling a validation unit validating said bit comparison.

18. A microcontroller according to claim 17, wherein said filter register comprises data bits indicating a mask register from a plurality of mask registers and a select unit coupled with said data bits for selecting one of said mask registers.

19. A microcontroller according to claim 10, wherein said buffer memory is a dual port memory and said central processing unit is coupled with one port of said memory and said data receive register is coupled with the other port of said buffer memory.

20. A method of operating a CAN module comprising the steps of:
receiving a data stream;
generating an identifier and data out of said data stream;
comparing said identifier with a filter value;
generating an acceptance signal if said comparison is positive, the acceptance signal dynamically assigning a filter register including the filter value to any one of a plurality of addressable buffers;
supplying an address upon generation of said acceptance signal to a buffer memory address input; and
storing associated data in said addressed buffer.

21. A method according to claim 20 further comprising the steps of comparing said identifier with a plurality of filter values and generating a programmable buffer address for each match.

22. A method according to claim 20, wherein said step of supplying an address comprises the steps of:
outputting an address upon generating said acceptance signal;
latching said address within an address register; and
addressing said buffer memory.

23. A method according to claim 20, wherein said comparison is performed in a serial way bit by bit.

24. A method according to claim 20, wherein said comparison is performed in a parallel way.

25. A method according to claim 20, further comprising the step of masking said identifier.

* * * * *